United States Patent
Johnsgard et al.

(10) Patent No.: US 7,771,514 B1
(45) Date of Patent: Aug. 10, 2010

(54) APPARATUS AND METHOD FOR PROVIDING HEATED EFFLUENT GASES TO A SCRUBBER

(75) Inventors: Mark Johnsgard, Milpitas, CA (US); Kris Johnsgard, Milpitas, CA (US)

(73) Assignee: Airgard, Inc., San Jose, CA (US)

( * ) Notice: Subject to any disclaimer, the term of this patent is extended or adjusted under 35 U.S.C. 154(b) by 1776 days.

(21) Appl. No.: 10/804,764

(22) Filed: Mar. 19, 2004

Related U.S. Application Data

(60) Provisional application No. 60/541,655, filed on Feb. 3, 2004.

(51) Int. Cl.
    B01D 47/06 (2006.01)
(52) U.S. Cl. .............................. 95/149; 96/266; 96/322; 96/270; 96/271; 95/227; 95/229
(58) Field of Classification Search .................... 95/288, 95/227, 228, 149, 229; 96/242, 243, 266, 96/372, 223, 238, 240, 248, 260, 267, 270, 96/271, 272, 322, 273, 274, 275, 277, 280, 96/379; 55/418.1; 118/715, 724; 438/540; 156/345, 646.1
    See application file for complete search history.

(56) References Cited

U.S. PATENT DOCUMENTS

| | | | | |
|---|---|---|---|---|
| 2,608,695 A | * | 9/1952 | Skibowski | .................. 4/255.02 |
| 3,681,895 A | * | 8/1972 | Zirngibl et al. | ............... 95/200 |
| 3,690,044 A | | 9/1972 | Boresta | |
| 3,888,955 A | * | 6/1975 | Maruko | ........................ 261/99 |
| 4,986,838 A | * | 1/1991 | Johnsgard | .................... 96/265 |
| 5,019,339 A | | 5/1991 | Keeney et al. | |
| 5,271,908 A | | 12/1993 | Shiban et al. | |
| 5,560,893 A | | 10/1996 | Okino et al. | |
| 5,756,052 A | | 5/1998 | Suzumura et al. | |
| 5,766,563 A | | 6/1998 | Tanaka et al. | |
| 5,846,275 A | * | 12/1998 | Lane et al. | ..................... 55/431 |
| 5,878,922 A | * | 3/1999 | Boring | ........................ 222/387 |
| 5,927,957 A | * | 7/1999 | Kennedy et al. | ............. 417/511 |
| 5,935,283 A | | 8/1999 | Sweeney et al. | |
| 6,029,100 A | | 2/2000 | Iwashita et al. | |

(Continued)

FOREIGN PATENT DOCUMENTS

DE      20 45 021 A1      3/1972

(Continued)

OTHER PUBLICATIONS

German Paper: Forderkennzeichen: 254 116 98 Thema: Verfahrensentwicklung zur Herstellung von Solar-Silicium im halbtechnischen Mabstab.

*Primary Examiner*—Duane Smith
(74) *Attorney, Agent, or Firm*—Carr & Ferrell LLP

(57) ABSTRACT

A low-maintenance scrubber inlet device is provided for delivering effluent gases to gas scrubbers. The scrubber inlet device comprises a scrubber interface device in fluid communication with an inlet manifold. The inlet manifold is configured to receive effluent gases and direct the effluent gases into the scrubber interface device while maintaining the temperature of the effluent gases. In some instances, a heated gas is introduced into the inlet manifold to maintain the effluent gas temperature. The scrubber interface device is configured to deliver the effluent gas stream from the inlet manifold to the gas scrubbing system, and to have a very low susceptibility to clogging.

26 Claims, 4 Drawing Sheets

U.S. PATENT DOCUMENTS

| | | | |
|---|---|---|---|
| 6,084,148 A | | 7/2000 | Shiban et al. |
| 6,090,208 A | * | 7/2000 | Han .......................... 118/715 |
| 6,331,281 B1 | * | 12/2001 | Teru et al. .................. 423/237 |
| 6,517,792 B2 | | 2/2003 | Shimizu et al. |
| 6,530,977 B2 | * | 3/2003 | Seeley et al. ................. 95/149 |
| 6,759,018 B1 | | 7/2004 | Arno et al. |
| 7,316,721 B1 | * | 1/2008 | Redden et al. ................ 55/428 |
| 7,550,123 B2 | | 6/2009 | Temple et al. |
| 7,611,684 B2 | * | 11/2009 | Johnsgard et al. ........... 423/210 |
| 7,635,501 B2 | * | 12/2009 | Komai et al. ............ 427/248.1 |
| 2001/0001645 A1 | | 5/2001 | Lee et al. |
| 2001/0009652 A1 | | 7/2001 | Arno |
| 2001/0032543 A1 | * | 10/2001 | Seeley et al. ................. 95/149 |
| 2004/0101460 A1 | | 5/2004 | Arno et al. |
| 2004/0202596 A1 | | 10/2004 | Honjo et al. |
| 2004/0213721 A1 | | 10/2004 | Arno et al. |
| 2005/0031500 A1 | | 2/2005 | Feng |
| 2005/0085057 A1 | * | 4/2005 | Hashikura et al. ........... 438/540 |
| 2006/0104878 A1 | | 5/2006 | Chiu |
| 2007/0172398 A1 | | 7/2007 | Clark |
| 2008/0233024 A1 | | 9/2008 | Lindau et al. |
| 2009/0205495 A1 | * | 8/2009 | Johnsgard et al. ............. 95/227 |

FOREIGN PATENT DOCUMENTS

| | | |
|---|---|---|
| EP | 0 429 942 A | 6/1991 |
| FR | 1 361 725 A | 5/1964 |
| GB | 1 328 990 A | 9/1973 |

* cited by examiner

APPARATUS AND METHOD FOR PROVIDING HEATED EFFLUENT GASES TO A SCRUBBER

CROSS-REFERENCE TO RELATED APPLICATIONS

This application claims the benefit of U.S. Provisional Patent Application Ser. No. 60/541,655, filed Feb. 3, 2004, entitled "Apparatus and Method for Providing Heated Effluent Gases to a Scrubber," which is incorporated herein by reference in its entirety.

BACKGROUND OF THE INVENTION

1. Field of the Invention

The present invention relates generally to the field of semiconductor fabrication, more particularly to the field of safely disposing of effluent gases from semiconductor processing equipment, and most particularly to low-maintenance devices for coupling processing equipment exhaust lines with gas scrubbers, and methods for delivering effluent gas streams into gas scrubbers.

2. Description of the Prior Art

A number of manufacturing processes, including those directed to producing semiconductor devices, produce quantities of effluent gases that cannot be released into the atmosphere without appropriate cleaning. One technique that is effective for cleaning many types of effluent gas streams, such as those that result from etching metal layers, is to pass the effluent gases through a gas scrubber. The scrubber sprays a liquid, typically water or another solvent, through multiple nozzles at the top of a chamber. Effluent gases enter the chamber through one or more inlets in the top of the chamber near the nozzles so that the gases rapidly interact with the spray. Although the nozzles direct the spray downward into the chamber and away from the inlets, mist from the spray nevertheless tends to enter the inlets. Where the mist enters, compounds from the effluent gases can nucleate from condensation or precipitate from the reaction with water and over time, sometimes quite rapidly, grow to form a mass that clogs the inlet. This, in turn, leads to expensive down-time as the processing system has to be shut down to clean the scrubber inlet.

Therefore, what is needed are apparatus for coupling gas scrubbers to processing equipment exhaust lines that resist clogging, and methods for delivering effluent gas streams into gas scrubbers that inhibit the formation of clogs and provide for clearing any clogs that do form without incurring down-time for associated processing equipment.

SUMMARY

The present invention provides a scrubber inlet device for delivering effluent gases to a gas scrubber. The scrubber inlet device comprises an inlet manifold in fluid communication with a scrubber interface device. In some embodiments, the inlet manifold is separable from the scrubber interface device. The inlet manifold includes a port configured to receive an effluent gas stream from an exhaust line, such as from a semiconductor processing chamber, and a heated gas inlet configured to receive a stream of heated gas. The scrubber interface device is configured to deliver the effluent gas stream from the inlet manifold to the gas scrubbing system.

The inlet manifold can include insulation around an exterior thereof, and the port of the inlet manifold can also include an insulating insert sleeve. The inlet manifold can also include a plunger for clearing the scrubber interface device of any clogs or blockages. In some of these embodiments, the plunger includes a perforated plunger head to allow the effluent gas stream to flow through the scrubber interface device whenever the plunger is extended therein. Also in some of these embodiments, the inlet manifold includes a recessed portion within which the plunger is retracted when not in use. In those embodiments in which the inlet manifold includes a recessed portion, the recessed portion can include the heated gas inlet, and in some of these embodiments the recessed portion can also include a gas distribution system to distribute the stream of heated gas from the heated gas inlet.

The scrubber interface device can include a lower portion having a generally cylindrical interior surface, and an insulated insert portion providing fluid communication between the inlet manifold and the lower portion of the scrubber inlet device. In some of these embodiments, the insulated insert portion extends into the inlet manifold. Also in some of these embodiments, the scrubber interface device includes a system for providing a washing fluid to the generally cylindrical interior surface of the lower portion. In those embodiments in which the scrubber interface device includes an insulated insert portion and the inlet manifold includes a plunger, the plunger can have a plunger head having a maximum diameter that is less than a minimum diameter of the insulated insert portion. In some of these embodiments, the insulated insert portion includes a tapered portion to help guide the plunger head into the scrubber interface device.

The scrubber inlet device can also comprise a source of heated gas configured to provide the stream of heated gas to the heated gas inlet. In some of these embodiments, the source of heated gas provides an inert gas, and in further embodiments the source of heated gas provides $N_2$. Also in some of these embodiments, the scrubber inlet device further comprises a gas temperature regulation system configured to regulate a temperature of the heated gas provided by the source of heated gas. The gas temperature regulation system can include a temperature sensor and a controller in electrical communication with the temperature sensor and with the source of heated gas. The gas temperature regulation system is configured to regulate the temperature of the heated gas according to a signal from the temperature sensor.

The present invention also provides a method for delivering an effluent gas stream into a gas scrubbing system. The method comprises receiving the effluent gas stream into a manifold, and heating interior surfaces of the manifold to near the condensation temperature of the effluent gas, which can be the condensation temperature of aluminum chloride, for example. The method also comprises providing the effluent gas stream to an interface device, where the interface device is effective to suppress nucleation of condensation from the effluent gas stream, and configured to direct the effluent gas stream into the gas scrubbing system. In some embodiments, heating interior surfaces of the inlet manifold includes flowing a heated gas stream into the inlet manifold. Also in some embodiments, providing the effluent gas stream to the interface device includes passing the effluent gas stream through an abrupt dry-to-wet and/or hot-to-cold transition region in order to suppress nucleation of condensation or precipitate. Further, heating interior surfaces of the manifold to near the condensation temperature of the effluent gas can include heating interior surfaces of the manifold to above the condensation temperature of the effluent gas. Additionally, the method can comprise clearing the interface device while providing the effluent gas stream to the interface device.

DETAILED DESCRIPTION OF THE INVENTION

Figure 1:
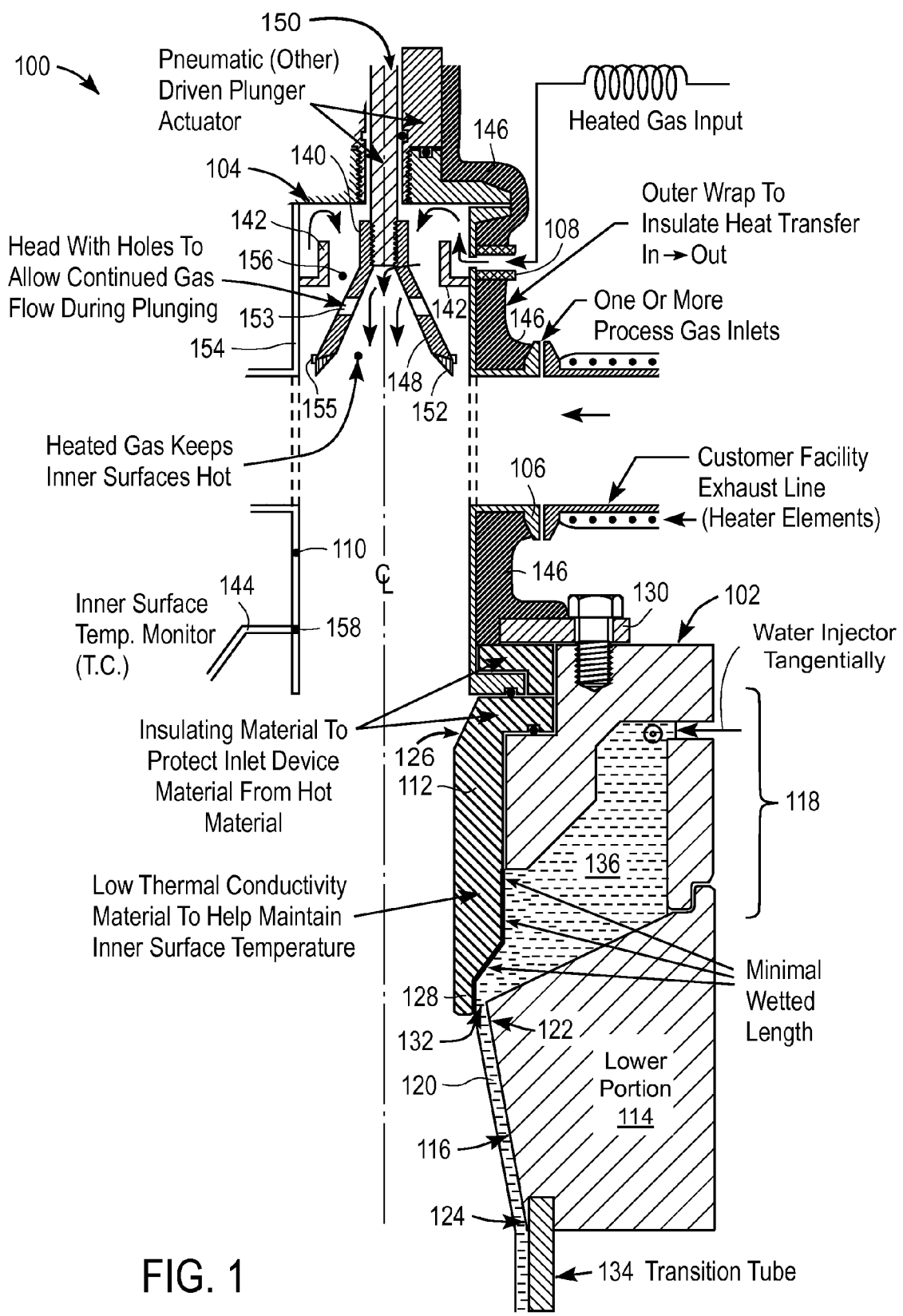
FIG. 1 is a cross-section of an exemplary scrubber inlet device according to an embodiment of the invention.

FIG. 1 shows a cross-section of an exemplary scrubber inlet device 100 of the present invention. The scrubber inlet device 100 in FIG. 1 is symmetric around a center line C/L and for clarity much of the left side of the scrubber inlet device 100 has been omitted. The scrubber inlet device 100 comprises a scrubber interface device 102 in fluid communication with an inlet manifold 104. The inlet manifold 104 is configured to receive an effluent gas stream at a first temperature and direct the effluent gas stream into the scrubber interface device 102 while maintaining the temperature at or near the first temperature to prevent condensation, as discussed more fully below. The scrubber interface device 102 is configured to deliver the effluent gas stream from the inlet manifold 104 to a gas scrubbing system, and to have a very low susceptibility to clogging.

The inlet manifold 104 includes at least one port 106 configured to be coupled to an exhaust line from a semiconductor (or other) processing chamber, an inlet 108 configured to be coupled to a source of heated gas, and an outlet 110 configured to be coupled to the scrubber interface device 102. In operation, effluent gas streams from one or more processing chambers enter the inlet manifold 104 at a first temperature through the at least one port 106 and exit from the inlet manifold 104 through the outlet 110. In the inlet manifold 104, the effluent gas streams are mixed with a stream of a heated and preferably inert gas, such as nitrogen, argon, or helium, that is introduced into the inlet manifold 104 through the inlet 108. The heated gas is intended to keep the temperature of the effluent gas streams at or near the first temperature, thereby keeping the interior surfaces of the inlet manifold 104 and of parts of the scrubber interface device 102 at or near the first temperature. In some embodiments, the heated gas raises the temperature of the effluent gas above the first temperature. Keeping the interior surfaces at or near the first temperature helps prevent condensation from the effluent gas stream from nucleating and growing on the interior surfaces which can lead to clogging of the scrubber inlet device 100.

The at least one port 106, the inlet 108, and the outlet 110 are preferably formed of a material that is chemically resistant or inert with respect to the corrosive effluent gases and their by-products, such as metal halides like aluminum chloride, at the temperature of operation, which can be as high as 80 to 150 degrees centigrade or higher. These components are also preferably formed of a material that has a low coefficient of thermal conductivity so that heat conduction through the walls of these components is reduced. Examples of suitable materials include stainless steel, Inconel, and Hastelloy alloys. Other suitable materials include ceramics and Teflon. In some embodiments, the at least one port 106 and the outlet 110 include flanges to allow these components to be coupled to exhaust lines from processing chambers and the scrubber interface device 102, respectively. It will be appreciated that while the exemplary embodiment in FIG. 1 shows the scrubber interface device 102 and the inlet manifold 104 as separable, in some embodiments the scrubber interface device 102 and the inlet manifold 104 are integrally formed.

The scrubber interface device 102 includes an insulated insert portion 112, a lower portion 114 having a generally cylindrical interior surface 116, and a system 118 for providing a washing fluid 120 to the generally cylindrical interior surface 116 of the lower portion 114. The generally cylindrical interior surface 116 includes a top end 122 and a bottom end 124. The bottom end 124 is configured to be coupled to an inlet port of a gas scrubbing system.

In operation, the system 118 provides a continuous flow of the washing fluid 120 to the cylindrical interior surface 116 near the top end 122 such that the washing fluid 120 swirls along the cylindrical interior surface 116 until it passes out of the bottom end 124 and into the gas scrubbing system. Swirling the washing fluid 120 causes the washing fluid 120 to form a swirling sheet that coats the cylindrical interior surface 116 while minimizing the production of mist or vapor. The washing fluid 120 is therefore effective to prevent the nucleation and growth of condensation on the cylindrical interior surface 116, and also produces little mist or vapor to support cooling and condensation within the insulated insert portion 112.

The insulated insert portion 112 includes a top end for receiving the effluent gas stream as it leaves the inlet manifold 104, and a bottom end 128 located proximate to the top end 122 of the lower portion 114. As noted, the top end couples to the outlet 110 of the inlet manifold 104 and can be configured, for example, to engage a flange of the outlet 110 as shown in FIG. 1. Additional coupling between the inlet manifold 104 and the scrubber interface device 102 can be achieved, for example, with a plate 130 bolted to the scrubber interface device 102 as shown. The bottom end 128 of the insulated insert portion 112 is positioned proximate to the top end 122 of the cylindrical interior surface 116 as shown in FIG. 1. In some embodiments, an opening 132 is formed between the top end 122 of the cylindrical interior surface 116 and the bottom end 128 of the insulated insert portion 112 through which washing fluid 120 can flow. As shown in FIG. 1, the bottom end 128 of the insulated insert portion 112 can be narrowed to a lip to help obtain good flow characteristics where the washing fluid 120 is introduced through the opening 132.

The insulated insert portion 112 is formed of a material with a low coefficient of thermal conductivity to prevent significant heat loss from the passing effluent gas stream until the effluent gas stream has reached the lower portion 114. The insulated insert portion 112 is also preferably formed of a material that is chemically resistant or inert with respect to the effluent gases at the temperature of operation. The insulated insert portion 112 is also preferably formed of a material that is capable of being formed with a highly smooth interior surface to reduce the number of sites at which condensation may nucleate. Ideally, the material also has a low coefficient of friction and is highly resistant to scratching. Teflon is one such material that is suitable for the insulated insert portion 112, although other materials are contemplated.

The lower portion 114 includes a generally cylindrical interior surface 116. As used herein, "generally cylindrical" means that the interior surface 116 need not have a constant cross-sectional area as does a right cylinder, but can flare or narrow between the top end 122 and the bottom end 124 while maintaining a circular cross-section. Accordingly, "generally cylindrical" includes, for example, the truncated conical shape shown in FIG. 1. In the embodiment shown in FIG. 1, the generally cylindrical interior surface 116 is formed into the material of the lower portion 114. In some embodiments, this material is polyvinyl chloride (PVC) and the generally cylindrical interior surface 116 is formed by machining. Another suitable material is polypropylene. Like the material of the insulated insert portion 112, the generally cylindrical interior surface 116 should be chemically inert or resistant to the effluent gases, and should be capable of being formed with a smooth finish so that the swirling washing fluid 120 conforms well to the generally cylindrical interior surface 116 with little formation of mist or vapor. While the embodiment shown in FIG. 1 has the generally cylindrical interior surface 116 formed into the lower portion 114, it will be appreciated that in some embodiments the generally cylindrical interior surface 116 can comprise an insert or a surface coating.

The lower portion 114 can also include means for engaging with the gas scrubbing system. In the embodiment shown in FIG. 1, the lower portion 114 has a circular groove that can engage a transition tube 134 that leads into the gas scrubbing system. Other engagement means will be readily apparent to those skilled in the art.

The scrubber interface device 102 also includes the system 118 for providing the washing fluid 120 to the generally cylindrical interior surface 116 of the lower portion 114. In some embodiments, the washing fluid is water. In the embodiment shown in FIG. 1, the system 118 includes a reservoir 136 within which the washing fluid 120 is made to rotate. Rotation of the washing fluid 120 can be achieved with one or more fluid injectors (not shown) that introduce the washing fluid 120 into the reservoir 136 with a tangential component. Other methods for causing the washing fluid 120 to rotate within the reservoir will be readily apparent to those of skill in the art. The reservoir 136 drains through the opening 132. In the embodiment shown in FIG. 1, the distance between the cylindrical interior surface 116 and the bottom end 128 of the insulated insert portion 112 regulates the rate at which the washing fluid 120 drains from the reservoir 136.

It will be appreciated that the scrubber interface device 102 is able to achieve a very low susceptibility to clogging because of an abrupt dry-to-wet and hot-to-cold transition region that exists where the bottom end 128 of the insulated insert portion 112 opens into the top end 122 of the lower portion 114. The desirability of this transition region is described in more detail in U.S. Pat. No. 4,986,838, incorporated herein by reference in its entirety.

Returning to the inlet manifold 104, several optional features will now be described. These features include a plunger 140 for clearing the scrubber interface device 102, a gas deflector 142, a gas temperature regulation system 144, and insulation 146. The plunger 140 includes a plunger head 148 and a rod 150. In operation, the rod 150 is used to drive the plunger head 148 down into the scrubber interface device 102 to clear any condensed materials from the interior surface of the insulated insert portion 112. Accordingly, the plunger head 148 has a maximum diameter that is slightly less than a minimum diameter of the insulated insert portion 112. The plunger head 148 can be, for example, a cylinder or conically shaped as shown in the embodiment of FIG. 1. Optionally, the plunger head 148 can also include a blade 152 to engage the interior surface of the insulated insert portion 112. Further, the plunger head 148 can also include perforations 153 that allow the effluent gas stream to continue to flow from the inlet manifold 104 and through the scrubber interface device 102 while the plunger head 148 is within the insulated insert portion 112. In these embodiments, use of the plunger 140 does not incur down-time for the attached processing systems to clear any restriction or build-up in the outlet 110 and the insulated insert portion 112 because the plunger 140 can be activated without having to cease processing in their processing chambers.

The plunger 140 can be driven either manually or mechanically, such as pneumatically, and can be initiated either manually or automatically. Automatic triggering of the plunger 140 can occur according to a periodic schedule, for example, after a predetermined period of operation, or can occur based on an indication of condensation formation. For instance, a significant buildup of condensation can be detected by monitoring a pressure in the inlet manifold 104. Whenever the pressure in the inlet manifold 104 exceeds a threshold, the plunger 140 is automatically activated. When not in use, the plunger 140 can be retracted into a recessed portion 154 of the inlet manifold 104 such that it is out of the way of the effluent gas stream. In some embodiments, the heated gas inlet 108 attaches to the recessed portion 154 of the inlet manifold 104 as shown in FIG. 1. Introducing the heated gas into the recessed portion 154 purges the recessed portion 154 which protects the mechanical parts of the plunger 140 from corrosive gases in the effluent gas stream.

In those embodiments that include the plunger 140, the insulated insert portion 112 can be advantageously shaped to help guide the plunger head 148, as shown in FIG. 1. As can be seen, the top end of the insulated insert portion 112 includes a taper that narrows to the minimum diameter of the insulated insert portion 112. Accordingly, since the plunger head 148 has a maximum diameter that is slightly less than the minimum diameter of the insulated insert portion 112, the taper helps guide the plunger head 148 into the insulated insert portion 112. In this respect, the plunger head 148 is self-aligning. The plunger head 148 can also include a spacer 155 to maintain a minimum clearance between any sharp edges and the surface of the insulated insert portion 112.

The inlet manifold 104 can also include the gas temperature regulation system 144. The gas temperature regulation system 144 is provided to regulate the temperature of the heated gas entering the inlet manifold 104. The gas temperature regulation system 144 includes a temperature sensor 158 and a controller (not shown) in electrical communication with the source of heated gas. In operation, when the temperature detected by the temperature sensor 158 falls below a set point, the controller directs the source of heated gas to raise the temperature of the heated gas. This can be accomplished by turning on a heating unit within the source of heated gas or by raising the operating temperature of the heating unit. The temperature sensor 158 can be located anywhere within the scrubber inlet device 100, but is preferably located in or near the inlet 108, or more preferably within the outlet 110 of the inlet manifold 104 near the junction with the scrubber interface device 102.

The gas temperature regulation system 144 optimizes energy usage by preventing the source of heated gas from heating the gas unnecessarily. The gas temperature regulation system 144 also helps to prevent the effluent gas stream from cooling below a condensation temperature before reaching the lower portion 114 of the scrubber interface device 102. This helps to prevent condensation from the effluent gas stream from nucleating within the inlet manifold 104 and scrubber interface device 102.

The inlet manifold 104 can also include insulation 146 around the exterior of the inlet manifold 104. The insulation 146 can be applied to the exterior of the inlet manifold 104, for example, as a blanket or as a coating. Preferred materials for the insulation 146 include silicone, fiberglass, and polyurethane insulations. The insulation 146 serves to further reduce heat loss through the walls of the inlet manifold 104.

Figure 2:
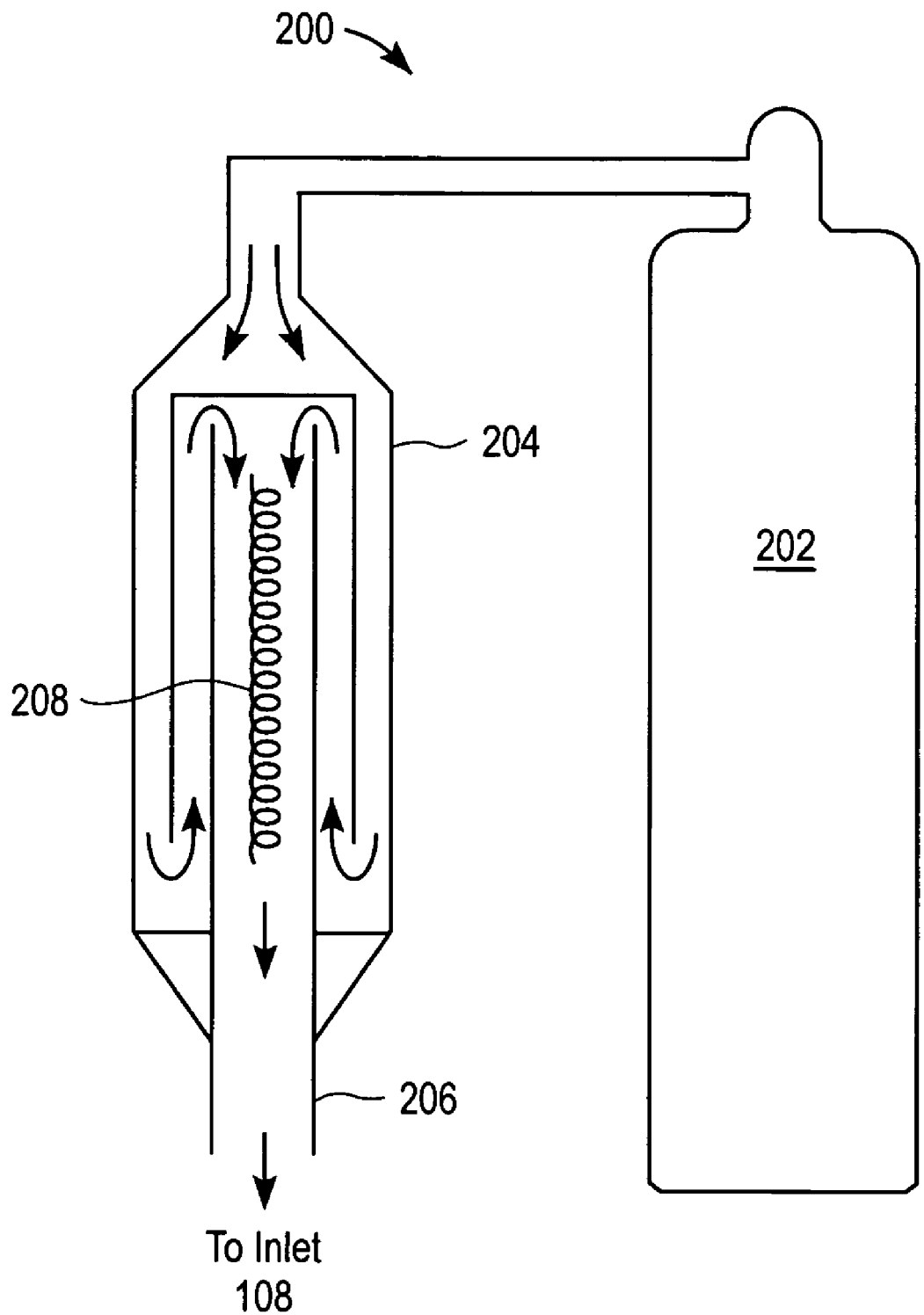
FIG. 2 is a schematic diagram of an exemplary source of heated gas for the scrubber inlet device of FIG. 1.

The scrubber inlet device 100 can also comprise the source of heated gas. An example of a representative source 200 is shown in FIG. 2. The source 200 comprises a supply of compressed gas 202, such as a dewer or compressed gas cylinder, connected by a gas line to a heating unit 204 (shown in cross-section). For simplicity, other common components in the gas line such as regulators and filters have been omitted. A gas line 206 that carries the heated gas to the inlet 108 (FIG. 1) is preferably insulated. The heating unit 204, in some embodiments, includes a baffle that directs incoming gas along the outer wall of the heating unit 204 to keep the exterior of the heating unit 204 cool. The gas is then directed into a central portion that includes an electric heating element 208. The electric heating element 208 heats the gas to a desired temperature. Preferably, the electric heating element 208 is controlled by a controller (not shown) that is able to vary the temperature of the electric heating element 208 in response to an output from the temperature sensor 158 (FIG. 1).

Figure 3:
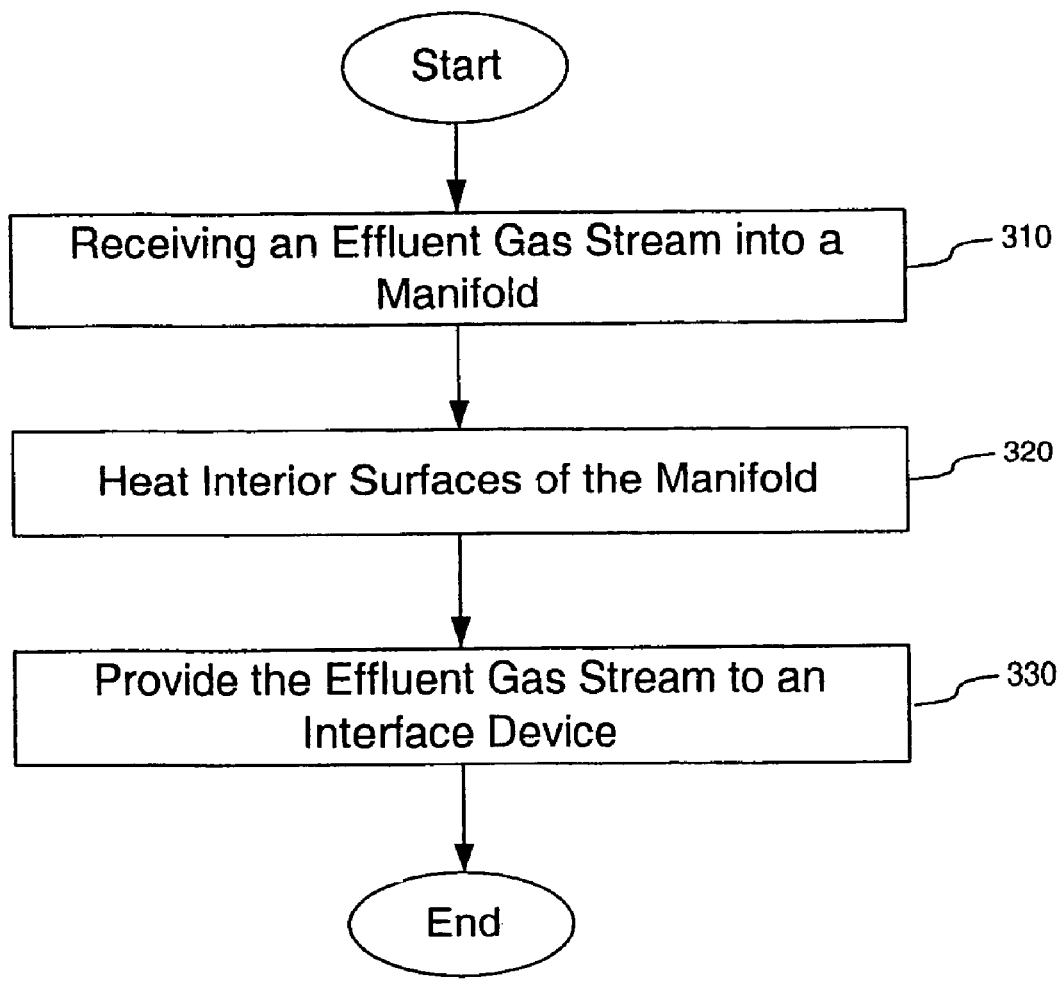
FIG. 3 is a flowchart illustrating an exemplary method for delivering an effluent gas stream into a gas scrubbing system according to an embodiment of the invention.

A method for delivering an effluent gas stream into a gas scrubbing system is illustrated by the flowchart of FIG. 3. The method comprises the steps of receiving an effluent gas stream into a manifold (step 310); heating interior surfaces of the manifold near or above a condensation temperature of the effluent gas (step 320); and providing the effluent gas stream to an interface device that is effective to suppress nucleation of condensation from the effluent gas stream (step 330). In some embodiments, the condensation temperature of the effluent gas is the condensation temperature of aluminum chloride.

In some embodiments, heating interior surfaces of the inlet manifold includes heating the inlet manifold with electric heating coils wrapped around the inlet manifold, or embedded within the walls of the inlet manifold. It will be appreciated that electric heating coils can also be replaced by coils that conduct a heated fluid. Heating can also be accomplished by directing heated gas at the inlet manifold or submersing the inlet manifold in a heated bath. In other embodiments, heating interior surfaces of the inlet manifold includes flowing a heated gas stream into the inlet manifold. Preferably, the flow rate of the heated gas into the inlet manifold is substantially greater than the flow rate of the effluent gas stream into the inlet manifold, which can be on the order of one liter per minute per port 106, for example. In some of these embodiments, the heated gas enters the inlet manifold at a rate of approximately 50 liters per minute.

In some embodiments, the interface device is effective to suppress nucleation of condensation because the interface device passes the effluent gas stream through an abrupt dry-to-wet and hot-to-cold transition region beyond which the walls are continuously flushed with washing fluid. In some embodiments, the interface device employs a washing fluid system to maintain the abrupt dry-to-wet transition region.

Figure 4:
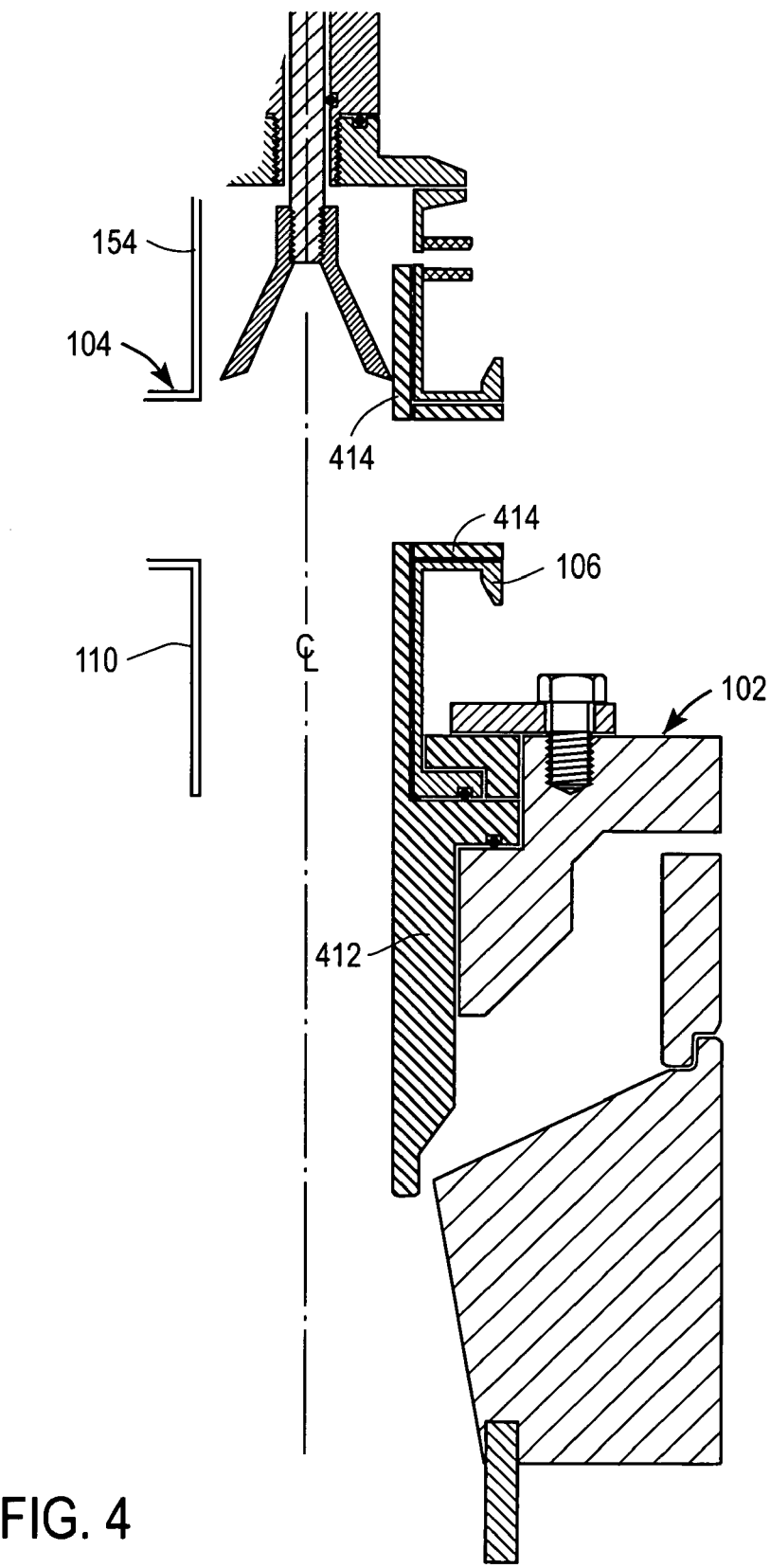
FIG. 4 is a cross-section of an exemplary scrubber inlet device according to another embodiment of the invention.

Another embodiment of the present invention is illustrated in FIG. 4. In this embodiment, an insulated insert portion 412 extends into the outlet 110 of the inlet manifold 104. Although the insulated insert portion 412 is shown in FIG. 4 as a single component, it will be appreciated that the portion of the insulated insert portion 412 within the outlet 110 can be a separate component so that it stays with the outlet 110 whenever the inlet manifold 104 is detached from the scrubber interface device 102. It will also be appreciated that similar insert sleeves 414 can also line the interior surfaces of the ports 106 and the recessed portion 154. The internal insulation shown in FIG. 4 can be used in place of, or in addition to, exterior insulation 146 (FIG. 1). The discussion above regarding suitable materials for the insulated insert portion 112 (FIG. 1) also applies to the insulated insert portion 412 and to the insert sleeves 414.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A scrubber inlet device comprising:
   an inlet manifold including
      a port configured to receive an effluent gas stream from an exhaust line and,
      a heated gas inlet configured to receive a stream of heated gas; and
   a scrubber interface device in fluid communication with the inlet manifold and configured to deliver the effluent gas stream from the inlet manifold to a gas scrubbing system, the scrubber interface device including an insulated insert portion.

2. The scrubber inlet device of claim 1 wherein the port includes an insulating insert sleeve.

3. The scrubber inlet device of claim 1 wherein the inlet manifold further includes insulation around an exterior thereof.

4. The scrubber inlet device of claim 1 wherein the scrubber interface device includes
   a lower portion having a generally cylindrical interior surface, and
   the insulated insert portion provides the fluid communication between the inlet manifold and the lower portion of the scrubber interface device.

5. The scrubber inlet device of claim 4 wherein the scrubber interface device further includes a system for providing a washing fluid to the generally cylindrical interior surface of the lower portion.

6. The scrubber inlet device of claim 4 wherein the insulated insert portion extends into the inlet manifold.

7. The scrubber inlet device of claim 1 wherein the inlet manifold is separable from the scrubber interface device.

8. A scrubber inlet device comprising:
   an inlet manifold including:
      a port configured to receive an effluent gas stream from an exhaust line and,
      a heated gas inlet configured to receive a stream of heated gas; and
   a scrubber interface device in fluid communication with the inlet manifold and configured to deliver the effluent gas stream from the inlet manifold to a gas scrubbing system,
   wherein the inlet manifold further includes a plunger for clearing the scrubber interface device.

9. The scrubber inlet device of claim 8 wherein the plunger includes a perforated plunger head to allow the effluent gas stream to flow through the scrubber interface device whenever the plunger head is disposed therein.

10. The scrubber inlet device of claim 8 wherein
   the scrubber interface device includes an insulated insert portion, having a minimum diameter, for providing fluid communication to the inlet manifold, and the plunger includes a plunger head having a maximum diameter less than the minimum diameter of the insulated insert portion.

11. The scrubber inlet device of claim 10 wherein the insulated insert portion includes a tapered portion.

12. The scrubber inlet device of claim 8 wherein the inlet manifold further includes a recessed portion within which the plunger is retracted when not in use.

13. The scrubber inlet device of claim 12 wherein the recessed portion includes the heated gas inlet.

14. The scrubber inlet device of claim 13 wherein the recessed portion includes a gas distribution system to distribute the stream of heated gas from the heated gas inlet.

15. The scrubber inlet device of claim 1 further comprising a source of heated gas configured to provide the stream of heated gas to the heated gas inlet.

16. The scrubber inlet device of claim 15 wherein the source of heated gas provides an inert gas.

17. The scrubber inlet device of claim 16 wherein the inert gas comprises $N_2$.

18. The scrubber inlet device of claim 15 further comprising a gas temperature regulation system configured to regulate a temperature of the heated gas provided by the source of heated gas.

19. The scrubber inlet device of claim 18 wherein the gas temperature regulation system includes
a temperature sensor, and
a controller in electrical communication with the temperature sensor and the source of heated gas and configured to regulate the temperature of the heated gas according to a signal from the temperature sensor.

20. A method for delivering an effluent gas stream into a gas scrubbing system comprising:
receiving the effluent gas stream into a manifold;
heating interior surfaces of the manifold to near a condensation temperature of the effluent gas; and
providing the effluent gas stream to an interface device including an insulated insert portion that is effective to suppress nucleation of condensation from the effluent gas stream, and
configured to direct the effluent gas stream into the gas scrubbing system.

21. The method of claim 20 wherein the condensation temperature of the effluent gas is the condensation temperature of aluminum chloride.

22. The method of claim 20 wherein heating interior surfaces of the manifold includes flowing a heated gas stream into the manifold.

23. The method of claim 20 wherein providing the effluent gas stream to the interface device includes passing the effluent gas stream through an abrupt hot-to-cold transition region in order to suppress condensation.

24. The method of claim 20 wherein heating interior surfaces of the manifold to near the condensation temperature of the effluent gas includes heating interior surfaces of the manifold to above the condensation temperature of the effluent gas.

25. The method of claim 20 further comprising clearing the interface device while providing the effluent gas stream to the interface device.

26. A scrubber inlet device comprising:
an inlet manifold including
a port configured to receive an effluent gas stream from an exhaust line at a first temperature and,
means for maintaining the effluent gas stream at or near the first temperature; and
a scrubber interface device in fluid communication with the inlet manifold and configured to deliver the effluent gas stream from the inlet manifold to a gas scrubbing system, the scrubber interface device including an insulated insert portion.

* * * * *